United States Patent
Wu (10) Patent No.: US 10,209,924 B2
(45) Date of Patent: Feb. 19, 2019

(54) ACCESS REQUEST SCHEDULING METHOD AND APPARATUS

(71) Applicant: Huawei Technologies Co., Ltd., Shenzhen (CN)

(72) Inventor: Zhijing Wu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 330 days.

(21) Appl. No.: 15/163,330

(22) Filed: May 24, 2016

(65) Prior Publication Data

US 2016/0350030 A1 Dec. 1, 2016

(30) Foreign Application Priority Data

May 25, 2015 (CN) .......................... 2015 1 0269945

(51) Int. Cl.
*G06F 3/06* (2006.01)
*G06F 13/16* (2006.01)

(52) U.S. Cl.
CPC .......... *G06F 3/0659* (2013.01); *G06F 3/0619* (2013.01); *G06F 3/0673* (2013.01); *G06F 13/1642* (2013.01)

(58) Field of Classification Search
CPC .... G06F 3/0659; G06F 3/0619; G06F 3/0673; G06F 13/1642
See application file for complete search history.

(56) References Cited

U.S. PATENT DOCUMENTS

| 7,996,597 | B1 | 8/2011 | Venkatramani et al. |
| 8,255,618 | B1 | 8/2012 | Borchers et al. |
| 2002/0147869 | A1* | 10/2002 | Owen ............ H04L 1/1671 710/105 |
| 2005/0122982 | A1* | 6/2005 | Li ............ H04L 12/56 370/395.41 |
| 2005/0201398 | A1* | 9/2005 | Naik ............ H04L 47/6295 370/412 |

(Continued)

FOREIGN PATENT DOCUMENTS

| CN | 1606301 A | 4/2005 |
| CN | 101221540 A | 7/2008 |

(Continued)

*Primary Examiner* — Ryan Bertram
*Assistant Examiner* — Edmund H Kwong
(74) *Attorney, Agent, or Firm* — Leydig, Voit & Mayer, Ltd.

(57) ABSTRACT

Embodiments of the present invention disclose an access request scheduling method and apparatus. The method includes: receiving a to-be-enqueued access request, and determining a memory that the to-be-enqueued access request requests to access; writing the to-be-enqueued access request to one queue in one access queue group corresponding to the memory; selecting one candidate access queue from each candidate access queue group, as a to-be-scheduled queue; selecting, from the to-be-scheduled queues according to an access timeslot of each memory, alternative queues that can participate in scheduling in a current clock period; selecting, from the alternative queues, a specified queue in scheduling in the current clock period; extracting a to-be-scheduled access request from the specified queue; and granting an access authorization to the to-be-scheduled access request.

20 Claims, 2 Drawing Sheets

(56) References Cited

U.S. PATENT DOCUMENTS

| | | | |
|---|---|---|---|
| 2007/0156946 A1 | 7/2007 | Lakshmanamurthy et al. | |
| 2008/0168241 A1 | 7/2008 | Raghavan | |
| 2009/0248994 A1 | 10/2009 | Zheng et al. | |
| 2010/0082879 A1* | 4/2010 | McKean | G06F 3/0611 |
| | | | 711/103 |
| 2010/0293343 A1 | 11/2010 | Perego | |
| 2011/0179200 A1 | 7/2011 | Sukonik et al. | |

FOREIGN PATENT DOCUMENTS

| | | |
|---|---|---|
| CN | 101868788 A | 10/2010 |
| CN | 101960431 A | 1/2011 |
| CN | 102129411 A | 7/2011 |
| EP | 2423820 A1 | 2/2012 |

\* cited by examiner

ACCESS REQUEST SCHEDULING METHOD AND APPARATUS

CROSS-REFERENCE TO RELATED APPLICATION

This application claims priority to Chinese Patent Application No. 201510269945.8, filed on May 25, 2015, which is hereby incorporated by reference in its entirety.

TECHNICAL FIELD

The embodiments of the present invention relates to the field of data storage, and in particular, to an access request scheduling method and apparatus.

BACKGROUND

As network technologies develop, requirements for a capacity and performance of a storage system are also increasingly high in the industry. To meet a requirement for performance of a storage system, in the prior art, generally multiple sub storage systems that independently schedule an access request are used to create the storage system, and to meet a requirement for a capacity of the storage system, each sub storage system may include multiple memories.

After receiving a request for accessing a memory, a storage system distributes the access request to a sub storage system in which the memory is located. After receiving the access request, the sub storage system places the access request in a corresponding scheduling queue according to features such as a source and an access type of the access request, and a scheduler determines, according to a preset priority scheduling policy, a scheduling queue in which an access request obtains an access authorization for accessing a memory. After obtaining the access authorization granted by the sub storage system, the access request is allocated to a memory that the access request is to access, and a corresponding access action is performed.

In the prior art, a scheduler usually determines, according to a priority scheduling policy, a scheduling queue in which an access request obtains an access authorization for accessing memory space. However, in the scheduling manner, in a case in which there are many access requests with high priorities, even if a memory that an access request with a low priority is to access is in an idle state, an access authorization cannot be granted to the access request with a low priority because the priority of the access request is relatively low. As a result, it is prone to access request access request congestion due to scheduling, and finally, overall performance of a storage system is affected.

SUMMARY

Embodiments of the present invention provide an access request scheduling method and apparatus, so as to resolve a problem that in an existing access request scheduling manner, it is prone to access request congestion due to scheduling.

According to a first aspect, an embodiment of the present invention provides a request scheduling method, used to schedule an access request in a storage system including multiple memories, where the method includes:

receiving a to-be-enqueued access request, and determining a memory that the to-be-enqueued access request requests to access, where the to-be-enqueued access request is used for requesting to access one or more memories; writing the to-be-enqueued access request into one queue in one access queue group corresponding to the memory, where the access queue group is one of multiple preset candidate access queue groups, the multiple preset candidate access queue groups include common candidate access queue groups that are in a one-to-one correspondence to the multiple memories, and a special candidate access queue group corresponding to at least two memories, and each candidate access queue group includes at least one candidate access queue; selecting one candidate access queue from each candidate access queue group, as a to-be-scheduled queue; selecting, from the to-be-scheduled queues according to an access timeslot of each memory, alternative queues that can participate in scheduling in a current clock period; selecting, from the alternative queues, a specified queue in scheduling in the current clock period; extracting a to-be-scheduled access request from the specified queue; and granting an access authorization to the to-be-scheduled access request.

With reference to the first aspect, in a first possible implementation manner of the first aspect, the writing the to-be-enqueued access request into one queue in one access queue group corresponding to the memory includes: when the to-be-enqueued access request is used for requesting to access the multiple memories, placing the to-be-enqueued access request in one access queue in the special candidate access request queue group.

With reference to the first possible implementation manner of the first aspect, in a second possible implementation manner of the first aspect, the placing the to-be-enqueued access request in one access queue in the special candidate access request queue group includes: when the special candidate access request queue group includes two candidate access request queues, placing the to-be-enqueued access request in one candidate access request queue in the special candidate access request queue group in a ping-pong enqueue manner.

With reference to the first aspect, in a third possible implementation manner of the first aspect, the writing the to-be-enqueued access request into one queue in one access queue group corresponding to the memory includes: when the to-be-enqueued access request is used for requesting to access one memory, determining a target memory that the to-be-enqueued access request is to access; and placing the to-be-enqueued access request in one access queue in a target common candidate access request queue group corresponding to the target memory.

With reference to the third possible implementation manner of the first aspect, in a fourth possible implementation manner of the first aspect, the placing the to-be-enqueued access request in one access queue in a target common candidate access request queue group corresponding to the target memory includes: when the target common candidate access request queue group includes two candidate access request queues, placing the to-be-enqueued access request in one of the candidate access request queues in a ping-pong enqueue manner.

With reference to the first aspect or any one of the first to the fourth possible implementation manners of the first aspect, in a fifth possible implementation manner of the first aspect, the selecting, from the to-be-scheduled queues, alternative queues that can participate in scheduling in a current clock period includes: determining, according to a record of an access timeslot scoreboard, an idle memory whose access timeslot corresponding to a current scheduling period is not occupied, where the access timeslot scoreboard is used for recording an occupation status of an access timeslot of each memory; and using a to-be-scheduled queue corresponding to the idle memory as the alternative queue.

With reference to the first aspect or any one of the first to the fifth possible implementation manners of the first aspect, in a sixth possible implementation manner of the first aspect, the selecting, from the alternative queues, a specified queue in scheduling in the current clock period includes: selecting an alternative queue with a highest weight from the alternative queues in a weighted round robin manner, as the specified queue.

With reference to the first aspect or any one of the first to the sixth possible implementation manners of the first aspect, in a seventh possible implementation manner of the first aspect, the granting an access authorization to the to-be-scheduled access request includes: when the to-be-scheduled access request is a traffic policing instruction, if in a preset instruction buffer, no authorized traffic policing instruction with an address the same as an address in the instruction buffer exists, granting the access authorization to the to-be-scheduled access request.

With reference to the first aspect or any one of the first to the sixth possible implementation manners of the first aspect, in an eighth possible implementation manner of the first aspect, the granting an access authorization to the to-be-scheduled access request includes: when the to-be-scheduled access request is a traffic policing instruction, if in a preset instruction buffer, an authorized traffic policing instruction with an address the same as an address in the instruction buffer exists, after the authorized traffic policing instruction is extracted, granting the access authorization to the to-be-scheduled access request.

With reference to the seventh or the eighth possible implementation manner of the first aspect, in a ninth possible implementation manner of the first aspect, after the granting an access authorization to the to-be-scheduled access request, the method further includes: after the access authorization is granted to the to-be-scheduled access request, buffering the to-be-scheduled access request to the instruction buffer, and extracting the to-be-scheduled access request after a first predetermined quantity of periods.

With reference to the first aspect or any one of the first to the seventh possible implementation manners of the first aspect, in a tenth possible implementation manner of the first aspect, after the granting an access authorization to the to-be-scheduled access request, the method further includes: when the to-be-scheduled access request is a traffic policing instruction, if an access authorization is already granted to a previous traffic policing instruction with a same access address in a second predetermined quantity of scheduling periods before the current scheduling period, combining the to-be-scheduled access request and the previous traffic policing instruction.

According to a second aspect, an embodiment of the present invention further provides a memory access request scheduling apparatus, configured to schedule an access request in a storage system including multiple memories, where the apparatus includes: a receiving unit, configured to receive a to-be-enqueued access request, and determine a memory that the to-be-enqueued access request requests to access, where the to-be-enqueued access request is used for requesting to access one or more memories; an enqueue unit, configured to write the to-be-enqueued access request into one queue in one access queue group corresponding to the memory, where the access queue group is one of multiple preset candidate access queue groups, the multiple preset candidate access queue groups include common candidate access queue groups that are in a one-to-one correspondence to the multiple memories, and a special candidate access queue group corresponding to at least two memories, and each candidate access queue group includes at least one candidate access queue; a to-be-scheduled queue determining unit, configured to select one candidate access queue from each candidate access queue group, as a to-be-scheduled queue; an alternative queue determining unit, configured to select, from the to-be-scheduled queues according to an access timeslot of each memory, alternative queues that can participate in scheduling in a current clock period; a specified queue determining unit, configured to select, from the alternative queues, a specified queue in scheduling in the current clock period; an acquiring unit, configured to extract a to-be-scheduled access request from the specified queue; and an authorization unit, configured to grant an access authorization to the to-be-scheduled access request.

With reference to the second aspect, in a first possible implementation manner of the second aspect, the enqueue unit is specifically configured to: when the to-be-enqueued access request is used for requesting to access the multiple memories, place the to-be-enqueued access request in one access queue in the special candidate access request queue group.

With reference to the first possible implementation manner of the second aspect, in a second possible implementation manner of the second aspect, the enqueue unit is specifically configured to: when the special candidate access request queue group includes two candidate access request queues, place the to-be-enqueued access request in one candidate access request queue in the special candidate access request queue group in a ping-pong enqueue manner.

With reference to the second aspect, in a third possible implementation manner of the second aspect, the enqueue unit includes: a memory determining subunit, configured to: when the to-be-enqueued access request is used for requesting to access one memory, determine a target memory that the to-be-enqueued access request is to access; and an access request enqueue subunit, configured to place the to-be-enqueued access request in one access queue in a target common candidate access request queue group corresponding to the target memory.

With reference to the third possible implementation manner of the second aspect, in a fourth possible implementation manner of the second aspect, the access request enqueue subunit is specifically configured to: when the target common candidate access request queue group includes two candidate access request queues, place the to-be-enqueued access request in one of the candidate access request queues in a ping-pong enqueue manner.

With reference to the second aspect or any one of the first to the fourth possible implementation manners of the second aspect, in a fifth possible implementation manner of the second aspect, the alternative queue determining unit includes: an idle memory determining subunit, configured to determine, according to a record of an access timeslot scoreboard, an idle memory whose access timeslot corresponding to a current scheduling period is not occupied, where the access timeslot scoreboard is used for recording an occupation status of an access timeslot of each memory; and an alternative queue selection subunit, configured to use a to-be-scheduled queue corresponding to the idle memory as the alternative queue.

With reference to the second aspect or any one of the first to the fifth possible implementation manners of the second aspect, in a sixth possible implementation manner of the second aspect, the specified queue determining unit is specifically configured to select an alternative queue with a highest weight from the alternative queues in a weighted round robin manner, as the specified queue.

With reference to the second aspect or any one of the first to the sixth possible implementation manners of the second aspect, in a seventh possible implementation manner of the second aspect, the authorization unit is specifically configured to: when the to-be-scheduled access request is a traffic policing instruction, and in a preset instruction buffer, no authorized traffic policing instruction with an address the same as an address in the instruction buffer exists, grant the access authorization to the to-be-scheduled access request.

With reference to the second aspect or any one of the first to the sixth possible implementation manners of the second aspect, in an eighth possible implementation manner of the second aspect, the authorization unit is specifically configured to: when the to-be-scheduled access request is a traffic policing instruction, and in a preset instruction buffer, an authorized traffic policing instruction with an address the same as an address in the instruction buffer exists, after the authorized traffic policing instruction is extracted, grant the access authorization to the to-be-scheduled access request.

With reference to the seventh or the eighth possible implementation manner of the second aspect, in a ninth possible implementation manner of the second aspect, the apparatus further includes: a buffering unit, configured to: after the access authorization is granted to the to-be-scheduled access request, buffer the to-be-scheduled access request to the instruction buffer, and extract the to-be-scheduled access request after a first predetermined quantity of periods.

With reference to the second aspect or any one of the first to the seventh possible implementation manners of the second aspect, in a tenth possible implementation manner of the second aspect, the apparatus further includes a combining unit, configured to: when the to-be-scheduled access request is a traffic policing instruction, and an access authorization is already granted to a previous traffic policing instruction with a same access address in a second predetermined quantity of scheduling periods before the current scheduling period, combine the to-be-scheduled access request and the previous traffic policing instruction.

In the embodiments of the present invention, one candidate access queue is selected from each candidate access queue group as a to-be-scheduled queue, where each candidate access queue group uniquely corresponds to one memory or one special type of access request, the special type of access request is an access request that accesses at least two memories simultaneously; alternative queues that can participate in scheduling in a current clock period are selected from the to-be-scheduled queues according to an access timeslot of each memory; a specified queue in scheduling in the current clock period is selected from the alternative queues; a to-be-scheduled access request is extracted from the specified queue; and an access authorization is granted to the to-be-scheduled access request. By means of the embodiments, whether a memory is in an idle state may be used as a scheduling basis for scheduling an access request, so that access request congestion due to scheduling can be effectively prevented, and overall performance of a storage system is improved.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. apparently, the described embodiments are merely some rather than all of the embodiments of the present invention. All other embodiments obtained by a person of ordinary skill in the art based on the embodiments of the present invention without creative efforts shall fall within the protection scope of the present invention.

Figure 1:
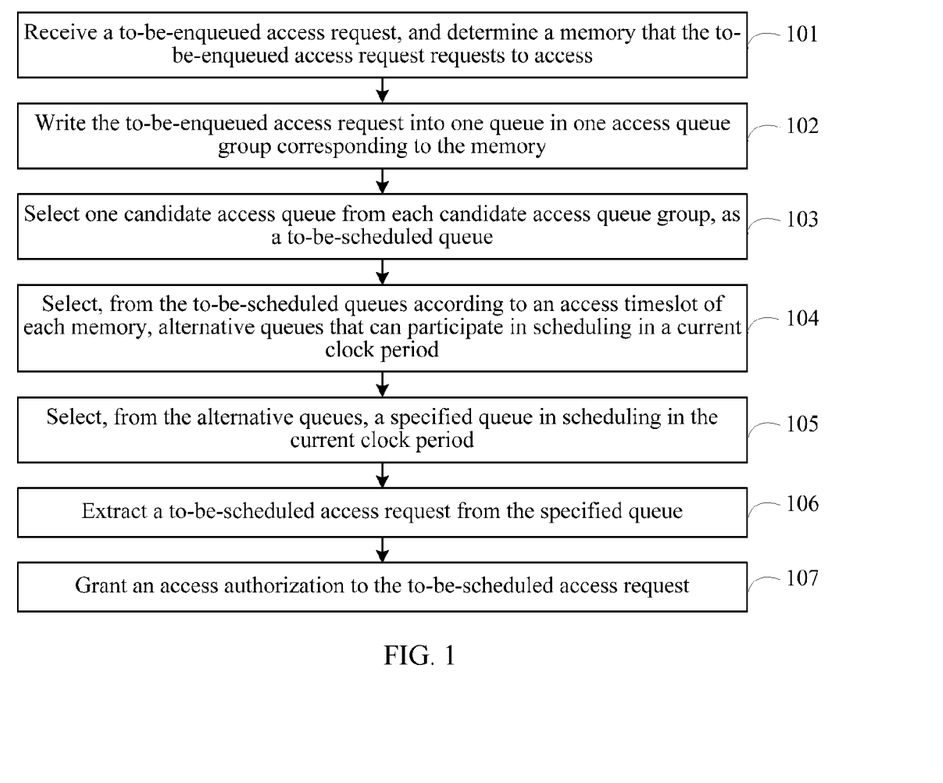
FIG. 1 is a flowchart of an embodiment of a memory access request scheduling method according to an embodiment of the present invention.

Refer to FIG. 1, which is a flowchart of a memory access request scheduling method according to an embodiment of the present invention. The method is used to schedule an access request in a storage system including multiple memories. As shown in FIG. 1, the method includes the following steps:

Step 101: Receive a to-be-enqueued access request, and determine a memory that the to-be-enqueued access request requests to access, where the to-be-enqueued access request is used for requesting to access one or more memories.

When scheduling an access request, a sub storage system first receives a to-be-enqueued access request, and determines a memory that the to-be-enqueued access request requests to access. When simultaneously receiving multiple to-be-enqueued access requests, the sub storage system may separately determine a memory that each to-be-enqueued access request requests to access.

The memory that the to-be-enqueued access request requests to access may be determined by using an access address carried in the to-be-enqueued access request. The sub storage system may first acquire the access address carried in the to-be-enqueued access request and an address range corresponding to each memory, and if the access address carried in the to-be-enqueued access request falls within an address range corresponding to a specific memory, the sub storage system may determine that the memory is the memory that the to-be-enqueued access request requests to access.

Step 102: Write the to-be-enqueued access request into one queue in one access queue group corresponding to the memory, where the access queue group is one of multiple preset candidate access queue groups, the multiple preset candidate access queue groups include common candidate access queue groups that are in a one-to-one correspondence to the multiple memories, and a special candidate access queue group corresponding to at least two memories, and each candidate access queue group includes at least one candidate access queue.

After the memory that the to-be-enqueued access request requests to access is determined, the to-be-enqueued access request may be written, according to a preset enqueue rule, into one queue in one access queue group corresponding to the memory.

The access queue group is one of multiple preset candidate access queue groups, the multiple preset candidate access queue groups include common candidate access queue groups that are in a one-to-one correspondence to the multiple memories, and a special candidate access queue group corresponding to at least two memories, each candidate access queue group includes at least one candidate access queues, and in order to reduce an area of a chip on the basis of meeting a time sequence requirement, each candidate access queue group may include two candidate access queues.

For example, when the sub storage system is including 16 memories, there may be 17 candidate access queue groups, and each candidate access queue group is including more than one candidate access queue. 16 candidate access queue groups in the 17 candidate access queue groups are common candidate access queue groups, where each of the common candidate access queue groups uniquely corresponds to one memory, and the remaining one may be a special candidate access queue group corresponding to at least two memories.

When the to-be-enqueued access request is used for requesting to access the multiple memories, the to-be-enqueued access request may be placed in one access queue in the special candidate access request queue group. When the to-be-enqueued access request is used for requesting to access one memory, a target memory that the to-be-enqueued access request is to access may be determined first; and then, the to-be-enqueued access request is placed in one access queue in a target common candidate access request queue group corresponding to the target memory.

A manner that is specifically used when the to-be-enqueued access request is placed in one candidate access request queue in a candidate access queue group varies with a different quantity of candidate access queues included in the candidate access queue group.

When a candidate access queue group corresponding to a special type of access request includes two candidate access request queues, the to-be-enqueued access request may be placed in one of the candidate access request queues in a ping-pong enqueue manner. That is, when the corresponding candidate access queue group includes a first candidate access request queue and a second candidate access request queue, in a case in which a previous to-be-enqueued access request is already placed in the first candidate access request queue, a current to-be-enqueued access request is placed in the second candidate access request queue, and a next to-be-enqueued access request may be placed in the first candidate access request queue.

Similarly, when a candidate access queue group corresponding to the target memory includes two candidate access request queues, the to-be-enqueued access request may also be placed in one of the candidate access request queues in the ping-pong enqueue manner.

Step 103: Select one candidate access queue from each candidate access queue group, as a to-be-scheduled queue.

When scheduling the access request, the sub storage system first selects one candidate access queue from each candidate access queue group, as a to-be-scheduled queue. A manner of selecting a candidate queue from a candidate queue group varies with a different quantity of candidate queues in each candidate queue group. When each candidate access queue group includes only two candidate access queues, one of the two candidate access queues may be selected in a round robin selection manner. When each candidate access queue group includes only multiple candidate access queues, one of the multiple candidate access queues may be selected in an ordered selection manner.

Step 104: Select, from the to-be-scheduled queues according to an access timeslot of each memory, alternative queues that can participate in scheduling in a current clock period.

In order to facilitate a search for an access timeslot of each memory, an access timeslot scoreboard used for recording an occupation status of the access timeslot of each memory may be preset. Then, an idle memory whose access timeslot corresponding to a current scheduling period is not occupied is determined according to a record of the access timeslot scoreboard; and a to-be-scheduled queue corresponding to the idle memory is used as the alternative queue.

Specifically, when scheduling the access request, the sub storage system may determine, according to the record of the Scoreboard, the idle memory whose access timeslot corresponding to the current scheduling period is not occupied, and continually update the scoreboard according to a scheduling status of the access request. Each time when one access request is scheduled, an access timeslot occupied by the access request is marked as unavailable. That an access timeslot, corresponding to a current scheduling period, of a memory is not occupied refers to that none of a predetermined quantity of access timeslots of the memory starting from the current scheduling period is occupied, where the predetermined quantity refers to a quantity of access timeslots needed to complete a read operation, a write operation, or a read-modify-write operation. If the access request is used for requesting to accessing multiple memories, an access authorization can be granted to the access request only in a case in which an access timeslot of each memory that the access request requests to access is not occupied.

A specific example shown in Table 1 is used to describe a method for searching for and updating the scoreboard below.

TABLE 1

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | | | | | | | | | | | | | | | | |
| 1 | | X | X | | | | X | X | | | | | X | X | | |
| 2 | | | X | X | | | | X | X | | | | | | | |
| 3 | | | | | | | | | | X | X | | | | | |
| 4 | | | | | X | X | | | | | X | X | | | | |
| 5 | | | | | | | | | | | | | | | | |
| 6 | | | | | | | | | | | | | | | | |
| 7 | | | | | | | | | | | | | | | | |

Each row in Table 1 indicates a memory, each column indicates an access timeslot, and X indicates that the timeslot of the memory is already occupied. Assuming that a read operation corresponding to a read request needs two clock periods, a write operation corresponding to a write request needs two clock periods, and a read-modify-write request corresponds to a read operation and a write operation, where the write operation needs to be performed after six clock periods are delayed relative with the read operation, in an access timeslot 0, a memory 1 has one read request, and a current access timeslot (the access timeslot 0) and a next access timeslot (an access timeslot 1) are both idle; therefore, the read request is allowed to be scheduled, and occupies the two access timeslots.

In the access timeslot 1, a current access timeslot of the memory 1 is already occupied; therefore, no access request in the memory is allowed to be scheduled. If a memory 2 has a read-modify-write request, and a current access timeslot (the access timeslot 1) and a next access timeslot (an access timeslot 2) are both idle, the request is allowed to be scheduled, and occupies access timeslots 1, 2, 7, and 8.

In an access timeslot 4, a memory 4 has a read-modify-write request, and a current access timeslot (the access timeslot 4) and a next access timeslot (an access timeslot 5) are both idle; therefore, the request is allowed to be scheduled, and occupies access timeslots 4, 5, 10, and 11.

In an access timeslot 6, the next access timeslot of the memory 2 is already occupied in advance by a read-modify-write request in the access timeslot 1; therefore, no access request in the memory is scheduled. The memory 1 has a read-modify-write request, and a current access timeslot (the access timeslot 6) and a next access timeslot (an access timeslot 7) are both idle; therefore, the access request is allowed to be scheduled, and occupies access timeslots 6, 7, 12, and 13.

In an access timeslot 9, the next access timeslot of the memory 4 is already occupied in advance by a read-modify-write request in the access timeslot 4; therefore, no access request in the memory is scheduled. A memory 3 has a read request, and a current access timeslot (the access timeslot 9) and a next access timeslot (an access timeslot 10) are both idle; therefore, the read request is allowed to be scheduled, and occupies access timeslots 9 and 10.

Step 105: Select, from the alternative queues, a specified queue in scheduling in the current clock period.

After the alternative queues are determined, one specified queue may be selected from the alternative queues according to a predetermined rule for selecting a specified queue. For example, one alternative queue with a highest weight may be selected from the alternative queues in a weighted round robin manner, as the specified queue. A weight of an alternative queue may be a quantity of access requests in the alternative queue, or may be a weight that is calculated and processed according to a quantity of access requests in the alternative queue and types of the access requests.

Step 106: Extract a to-be-scheduled access request from the specified queue.

After the specified queue is determined, one access request may be extracted from the specified queue as a to-be-scheduled access request according to a first in first out rule or the like.

Step 107: Grant an access authorization to the to-be-scheduled access request.

After the to-be-scheduled access request is extracted, the sub storage system may directly grant an access authorization to the to-be-scheduled access request, to enable the to-be-scheduled access request to be sent to a memory that the to-be-scheduled access request is to access, so as to complete scheduling on the access request.

Because a memory access request includes a traffic policing instruction, multiple traffic policing instructions are continuously executed for a same memory in N clock periods according to an execution rule of a traffic policing instruction, and only one execution result can be obtained, where a value of N is a quantity of clock periods needed for executing the traffic policing instructions completely.

For example, when a traffic policing instruction is a POLICE request, four clock periods are needed to execute the traffic policing instruction completely. When a first POLICE request for a specific memory starts to be calculated, and when the traffic policing instruction starts to be executed in following four clock periods, and a subsequent POLICE request for the memory is calculated, only an intermediate value in calculation of the first POLICE request can be obtained.

Therefore, when the access request is a traffic policing instruction, the traffic policing instruction may be further controlled, to prevent the traffic policing instruction from occupying too many resources, thereby further improving access performance for the memory.

In a possible implementation manner, an authorization to the traffic policing instruction may be controlled in back pressure mode. The back pressure mode refers to that, when the to-be-scheduled access request is a traffic policing instruction, it is determined, according to whether an authorized traffic policing instruction is executed completely, whether to grant the access authorization to the to-be-scheduled access request.

Specifically, in actual use, an instruction buffer may be preset, and the instruction buffer is used to buffer a traffic policing instruction to which an access authorization is granted. When the to-be-scheduled access request is a traffic policing instruction, it may be determined whether an authorized traffic policing instruction with an address the same as an address in the instruction buffer exists in the instruction buffer, and if no authorized traffic policing instruction with the address the same as the address in the instruction buffer exists in the instruction buffer, the access authorization is granted to the to-be-scheduled access request. After the traffic policing instruction is authorized, after the access authorization is granted to the to-be-scheduled access request, the to-be-scheduled access request may be further buffered in the instruction buffer, and the to-be-scheduled access request is extracted after a first predetermined quantity of periods, to create a condition for performing back pressure on a subsequent traffic policing instruction.

If an authorized traffic policing instruction with the address the same as the address in the instruction buffer exists in the instruction buffer, after the authorized traffic policing instruction is extracted, the access authorization may be granted to the to-be-scheduled access request. After a traffic policing instruction is authorized, similarly, after the access authorization is granted to the to-be-scheduled access request, the to-be-scheduled access request may also be buffered in the instruction buffer, and the to-be-scheduled access request is extracted after a first predetermined quantity of periods, to create a condition for performing back pressure on a subsequent traffic policing instruction.

In another possible implementation manner, traffic policing instructions with a same access address may be combined in bypass mode. The bypass mode refers to that, after an access authorization is granted to a traffic policing instruction, a memory does not immediately execute the traffic policing instruction, but may combine traffic policing instructions that can be combined and then execute the traffic policing instruction.

Specifically, after the sub storage system grants the access authorization to the to-be-scheduled access request, if the to-be-scheduled access request is a traffic policing instruction, the sub storage system does not immediately execute the traffic policing instruction, but first determines whether an access authorization to a previous traffic policing instruction is granted with a same access address in a second predetermined quantity of a scheduling periods before the current scheduling period, and if the sub storage system grants the access authorization to the previous traffic policing instruction with the same access address, may combine the to-be-scheduled access request and the previous traffic policing instruction.

Values of the second predetermined quantity and the first predetermined quantity may be determined by a processing rate of a traffic policing instruction. The value of the first predetermined quantity may be greater than or equal to a quantity of periods needed for executing the traffic policing instruction. The value of the second predetermined quantity may be less than or equal to the quantity of periods needed for executing the traffic policing instruction. In a normal case, the value of the first predetermined quantity and the second predetermined quantity may be set to a quantity of clock periods needed for executing a traffic policing instruction completely.

Using that the traffic policing instruction is a POLICE request as an example, the value of the first predetermined quantity may be greater than or equal to 4, and the value of the second predetermined quantity may be less than or equal to 4. In a normal case, the value of the first predetermined quantity and the value of the second predetermined quantity may be both set to 4.

In this embodiment, one candidate access queue is selected from each candidate access queue group as a to-be-scheduled queue, where each candidate access queue group uniquely corresponds to one memory or one special type of access request, the special type of access request may be an access request that accesses at least two memories simultaneously; alternative queues that can participate in scheduling in a current clock period are selected from the to-be-scheduled queues according to an access timeslot of each memory; a specified queue in scheduling in the current clock period is selected from the alternative queues; a to-be-scheduled access request is extracted from the specified queue; and an access authorization is granted to the to-be-scheduled access request. By means of this embodiment, whether a memory is in an idle state may be used as a scheduling basis for scheduling an access request, so that a case in which an access authorization can be granted to the access request due to access request congestion due to scheduling can be effectively prevented and overall performance of a storage system is improved.

Figure 2:
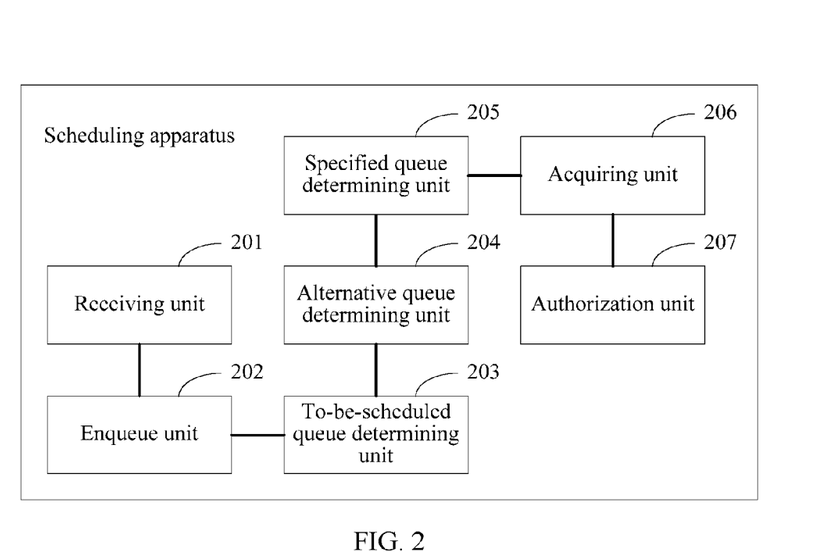
FIG. 2 is a schematic structural diagram of an embodiment of a memory access request scheduling apparatus according to an embodiment of the present invention.

Refer to FIG. 2, which is a schematic structural diagram of a memory access request scheduling apparatus according to an embodiment of the present invention.

As shown in FIG. 2, the apparatus includes: a receiving unit 201, an enqueue unit 202, a to-be-scheduled queue determining unit 203, an alternative queue determining unit 204, a specified queue determining unit 205, an acquiring unit 206, and an authorization unit 207.

The receiving unit 201 is configured to receive a to-be-enqueued access request, and determine a memory that the to-be-enqueued access request requests to access, where the to-be-enqueued access request is used for requesting to access one or more memories. The enqueue unit 202 is configured to write the to-be-enqueued access request into one queue in one access queue group corresponding to the memory, where the access queue group is one of multiple preset candidate access queue groups, the multiple preset candidate access queue groups include common candidate access queue groups that are in a one-to-one correspondence to the multiple memories, and a special candidate access queue group corresponding to at least two memories, and each candidate access queue group includes at least one candidate access queue. The to-be-scheduled queue determining unit 203 is configured to select one candidate access queue from each candidate access queue group, as a to-be-scheduled queue. The alternative queue determining unit 204 is configured to select, from the to-be-scheduled queues according to an access timeslot of each memory, alternative queues that can participate in scheduling in a current clock period. The specified queue determining unit 205 is configured to select, from the alternative queues, a specified queue in scheduling in the current clock period. The acquiring unit 206 is configured to extract a to-be-scheduled access request from the specified queue. The authorization unit 207 configured to grant an access authorization to the to-be-scheduled access request.

Optionally, the enqueue unit 202 is specifically configured to: when the to-be-enqueued access request is used for requesting to access the multiple memories, place the to-be-enqueued access request in one access queue in the special candidate access request queue group.

Optionally, the enqueue unit 202 is specifically configured to: when the special candidate access request queue group includes two candidate access request queues, place the to-be-enqueued access request in one candidate access request queue in the special candidate access request queue group in a ping-pong enqueue manner.

Optionally, a memory determining subunit is configured to: when the to-be-enqueued access request is used for requesting to access one memory, determine a target memory that the to-be-enqueued access request is to access; and an access request enqueue subunit is configured to place the to-be-enqueued access request in one access queue in a target common candidate access request queue group corresponding to the target memory.

Optionally, the access request enqueue subunit is specifically configured to: when the target common candidate access request queue group includes two candidate access request queues, place the to-be-enqueued access request in one of the candidate access request queues in a ping-pong enqueue manner.

Optionally, the alternative queue determining unit 204 includes: an idle memory determining subunit, configured to determine, according to a record of an access timeslot scoreboard, an idle memory whose access timeslot corresponding to a current scheduling period is not occupied, where the access timeslot scoreboard is used for recording an occupation status of an access timeslot of each memory; and an alternative queue selection subunit, configured to use a to-be-scheduled queue corresponding to the idle memory as the alternative queue.

Optionally, the specified queue determining unit 205 is specifically configured to select an alternative queue with a highest weight from the alternative queues in a weighted round robin manner, as the specified queue.

Optionally, the authorization unit 207 is specifically configured to: when the to-be-scheduled access request is a traffic policing instruction, and in a preset instruction buffer, no authorized traffic policing instruction with an address the same as an address in the instruction buffer exists, grant the access authorization to the to-be-scheduled access request.

Optionally, the authorization unit 207 is specifically configured to: when the to-be-scheduled access request is a traffic policing instruction, and in a preset instruction buffer, an authorized traffic policing instruction with an address the same as an address in the instruction buffer exists, after the authorized traffic policing instruction is extracted, grant the access authorization to the to-be-scheduled access request.

Optionally, the apparatus further includes: a buffering unit, configured to: after the access authorization is granted to the to-be-scheduled access request, buffer the to-be-scheduled access request to the instruction buffer, and extract the to-be-scheduled access request after a first predetermined quantity of periods.

Optionally, the apparatus further includes: a combining unit, configured to: when the to-be-scheduled access request is a traffic policing instruction, and an access authorization is already granted to a previous traffic policing instruction with a same access address in a second predetermined quantity of scheduling periods before the current scheduling period, combine the to-be-scheduled access request and the previous traffic policing instruction.

Figure 3:
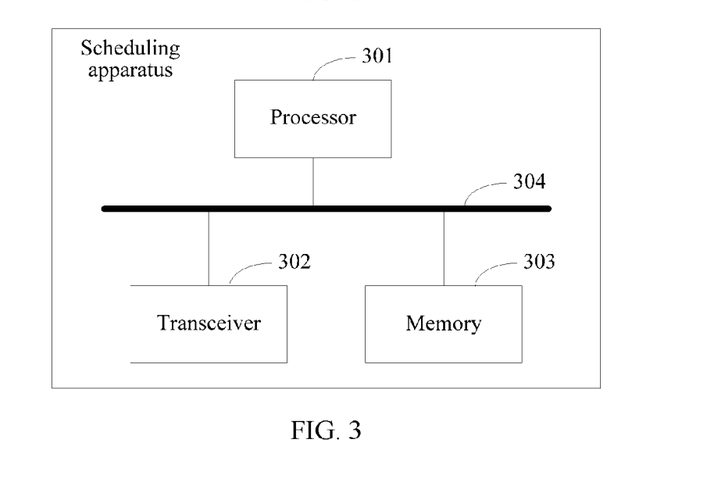
FIG. 3 is a schematic structural diagram of a memory access request scheduling apparatus according to another embodiment of the present invention.

Refer to FIG. 3, which is a schematic structural diagram of an access request scheduling apparatus according to another embodiment of the present invention.

As shown in FIG. 3, the apparatus may include: a processor 301, a transceiver 302, a memory 303, and other necessary components, where the components are connected by using one or more buses 304.

The processor 301 is a control center of the scheduling apparatus, and connects to various parts of the entire scheduling apparatus by using various interfaces and lines. By running or executing a software program and/or module stored in a memory, and invoking data stored in the memory, the processor 301 performs various functions and/or data processing of the scheduling apparatus. The processor 301 may be including an integrated circuit (IC for short), for example, may be including a single packaged IC, or may be including connecting multiple packaged ICs with a same function or packaged ICs with different functions. For example, the processor 301 may include only a central processing unit (CPU for short), or may be a combination of a GPU, a digital signal processor (DSP for short), and a control chip (such as a base band chip) in a communications unit. In implementation manners of embodiments of the present invention, the CPU may be a signal computing core or may include multiple computing cores.

The transceiver 302 is configured to establish a communications channel, to enable the scheduling apparatus to connect to a remote server by using the communications channel, and download media data from the remote server. The transceiver 302 may include a communication module such as a wireless local area network (wireless LAN for short) module, a Bluetooth module, or a base band module, and a radio frequency (RF for short) circuit corresponding to the communications module, configured to perform communication by using a wireless local area network, perform Bluetooth communication, perform infrared communication, and/or perform communication by using a cellular communications system, for example, Wideband Code Division Multiple Access (W-CDMA for short) and/or High Speed Downlink Packet Access (HSDPA for short). The communications module is configured to control communication of each component in the scheduling apparatus, and may support direct memory access.

The memory 303 may be configured to store a software program and module. The processing unit executes various functional applications and performs data processing in the scheduling apparatus by running the software program and module stored in the memory 303. The memory 303 may mainly include a program storage area and a data storage area. The program storage area may store an operating system, an application program required by at least one function, such as a sound playback program and an image display program. The data storage area may store data (such as audio data and an address book) created according to use of the scheduling apparatus, and the like. In a specific implementation manner of an embodiment of the present invention, the memory 303 may include a volatile memory, for example, a non-volatile dynamic random access memory (NVRAM for short), a phase change random access memory (PRAM for short), a magnetoresistive random access memory (MRAM for short), and the like, and may further include a non-volatile memory, such as at least one magnetic disk storage, an electrically erasable programmable read-only memory (EEPROM for short), and a flash memory such as a NOR flash memory or a NAND flash memory. The non-volatile memory stores an operating system and an application that are executed by the processing unit. The processing unit loads a running program and data to a memory from the non-volatile memory and stores digital content in a mass storage apparatus. The operating system includes various components and/or drives that are configured to control and manage a general system task, for example, memory management, storage device control, and power management and that facilitate communication between various software and hardware.

In this embodiment of the present invention, the transceiver 302 is configured to receive a to-be-enqueued access request. The processor 301 is configured to determine a memory that the to-be-enqueued access request requests to access, where the to-be-enqueued access request is used for requesting to access one or more memories; write the to-be-enqueued access request into one queue in one access queue group corresponding to the memory, where the access queue group is one of multiple preset candidate access queue groups, the multiple preset candidate access queue groups include common candidate access queue groups that are in a one-to-one correspondence to the multiple memories, and a special candidate access queue group corresponding to at least two memories, and each candidate access queue group includes at least one candidate access queue; select one candidate access queue from each candidate access queue group, as a to-be-scheduled queue; select, from the to-be-scheduled queues according to an access timeslot of each memory, alternative queues that can participate in scheduling in a current clock period; selecting, from the alternative queues, a specified queue in scheduling in the current clock period; extract a to-be-scheduled access request from the specified queue; and grant an access authorization to the to-be-scheduled access request.

Optionally, the processor 301 may be further configured to: when the to-be-enqueued access request is used for requesting to access the multiple memories, place the to-be-enqueued access request in one access queue in the special candidate access request queue group.

Optionally, the processor 301 may be further configured to: when the special candidate access request queue group includes two candidate access request queues, place the to-be-enqueued access request in one candidate access request queue in the special candidate access request queue group in a ping-pong enqueue manner.

Optionally, the processor 301 may be further configured to: when the to-be-enqueued access request is used for requesting to access one memory, determining a target memory that the to-be-enqueued access request is to access; and placing the to-be-enqueued access request in one access queue in a target common candidate access request queue group corresponding to the target memory.

Optionally, the processor 301 may be further configured to: when the target common candidate access request queue group includes two candidate access request queues, place the to-be-enqueued access request in one of the candidate access request queues in a ping-pong enqueue manner.

Optionally, the processor 301 may be further configured to determine, according to a record of an access timeslot scoreboard, an idle memory whose access timeslot corresponding to a current scheduling period is not occupied, where the access timeslot scoreboard is used for recording an occupation status of an access timeslot of each memory; and use a to-be-scheduled queue corresponding to the idle memory as the alternative queue.

Optionally, the processor 301 may be further configured to select an alternative queue with a highest weight from the alternative queues in a weighted round robin manner, as the specified queue.

Optionally, the processor 301 may be further configured to: when the to-be-scheduled access request is a traffic policing instruction, if in a preset instruction buffer, no authorized traffic policing instruction with an address the same as an address in the instruction buffer exists, grant the access authorization to the to-be-scheduled access request. The instruction buffer may be located in the memory 303.

Optionally, the processor 301 may be further configured to: when the to-be-scheduled access request is a traffic policing instruction, if in a preset instruction buffer, an authorized traffic policing instruction with an address the same as an address in the instruction buffer exists, after the authorized traffic policing instruction is extracted, grant the access authorization to the to-be-scheduled access request.

Optionally, the processor 301 may be further configured to: after the access authorization is granted to the to-be-scheduled access request, buffer the to-be-scheduled access request to the instruction buffer, and extract the to-be-scheduled access request after a first predetermined quantity of periods.

Optionally, the processor 301 may be further configured to: when the to-be-scheduled access request is a traffic policing instruction, if an access authorization is already granted to a previous traffic policing instruction with a same access address in a second predetermined quantity of scheduling periods before the current scheduling period, combine the to-be-scheduled access request and the previous traffic policing instruction.

A person skilled in the art may clearly understand that, the technologies in the embodiments of the present invention may be implemented by software in addition to a necessary general hardware platform. Based on such an understanding, the technical solutions in the embodiments of the present invention essentially or the part contributing to the prior art may be implemented in a form of a software product. The computer software product may be stored in a storage medium, such as a ROM/RAM, a magnetic disk, or an optical disc, and includes several instructions for instructing a computer device (which may be a personal computer, a server, or a network device) to perform the methods described in the embodiments or some parts of the embodiments of the present invention.

The embodiments in this specification are all described in a progressive manner, for same or similar parts in the embodiments, reference may be made to these embodiments, and each embodiment focuses on a difference from other embodiments. Especially, a system embodiment is basically similar to a method embodiment, and therefore is described briefly; for related parts, reference may be made to partial descriptions in the method embodiment.

The foregoing descriptions are implementation manners of the present invention, but are not intended to limit the protection scope of the present invention. Any modification, equivalent replacement, and improvement made without departing from the spirit and principle of the present invention shall fall within the protection scope of the present invention.

What is claimed is:

1. A memory access request scheduling method, used to schedule an access request in a storage system comprising a multiple memories, wherein the method comprises:
    receiving a to-be-enqueued access request, and determining a memory to which the to-be-enqueued access request requests access, wherein the to-be-enqueued access request is used for requesting access to one or more of the multiple memories;
    writing the to-be-enqueued access request into a first queue in a first access queue group corresponding to the memory,
        wherein the first access queue group is one of a multiple preset candidate access queue groups in the storage system,
        wherein the multiple preset candidate access queue groups comprise:
            common candidate access queue groups that are in a one-to-one correspondence to the multiple memories, and
            a special candidate access queue group corresponding to at least two of the multiple memories, and
        wherein each one of the multiple preset candidate access queue groups comprises at least one candidate access queue;
    first selecting a group of to-be-scheduled queues by selecting one candidate access queue from each one of the multiple preset candidate access queue groups, as a to-be-scheduled queue;
    second selecting, from the group of to-be-scheduled queues and according to an access timeslot of each memory of the multiple memories, an alternative queues that can participate in scheduling in a current clock period wherein selecting an alternative queue of the alternative queues comprises:
        determining, according to a record of an access timeslot scoreboard, an idle memory of the group of memories whose access timeslot corresponding to a current scheduling period is not occupied, wherein the access timeslot scoreboard is used for recording an occupation status of an access timeslot of each memory, and
        using a to-be-scheduled queue corresponding to the idle memory as the alternative queue of the alternative queues;
    third selecting, from the alternative queues provided by the second selecting, a specified queue in scheduling in the current clock period;
    extracting a to-be-scheduled access request from the specified queue; and
    granting an access authorization to the to-be-scheduled access request.

2. The method according to claim 1, wherein the writing the to-be-enqueued access request into one queue in one access queue group corresponding to the memory comprises:

when the to-be-enqueued access request is used for requesting access to the more than one memories, placing the to-be-enqueued access request in one access queue in the special candidate access queue group.

3. The method according to claim 2, wherein the placing the to-be-enqueued access request in one access queue in the special candidate access request queue group comprises:

when the special candidate access request queue group comprises two candidate access request queues, placing the to-be-enqueued access request in one candidate access request queue in the special candidate access request queue group in a ping-pong enqueue manner.

4. The method according to claim 1, wherein the writing the to-be-enqueued access request into one queue in one access queue group corresponding to the memory comprises:

when the to-be-enqueued access request is used for requesting access to one memory, determining a target memory that the to-be-enqueued access request is to access; and placing the to-be-enqueued access request in one access queue in a target common candidate access request queue group corresponding to the target memory.

5. The method according to claim 4, wherein the placing the to-be-enqueued access request in one access queue in a target common candidate access request queue group corresponding to the target memory comprises:

when the target common candidate access request queue group comprises two candidate access request queues, placing the to-be-enqueued access request in one of the candidate access request queues in a ping-pong enqueue manner.

6. The method according to claim 1, wherein the third selecting comprises:

selecting an alternative queue with a highest weight from the alternative queues in a weighted round robin manner, as the specified queue.

7. The method according to claim 1, wherein the granting an access authorization to the to-be-scheduled access request comprises:

when the to-be-scheduled access request is a traffic policing request for a specific memory, when in a preset instruction buffer, no authorized traffic policing request for a specific memory with an address the same as an address in the instruction buffer exists, granting the access authorization to the to-be-scheduled access request.

8. The method according to claim 1, wherein the granting an access authorization to the to-be-scheduled access request comprises:

when the to-be-scheduled access request is a traffic policing request for a specific memory, when in a preset instruction buffer, an authorized traffic policing request for a specific memory with an address the same as an address in the instruction buffer exists, after the authorized traffic policing request for a specific memory is extracted, granting the access authorization to the to-be-scheduled access request.

9. The method according to claim 8 further comprising:

after the access authorization is granted to the to-be-scheduled access request, buffering the to-be-scheduled access request to the instruction buffer, and extracting the to-be-scheduled access request after a first predetermined quantity of periods.

10. The method according to claim 1 further comprising, after the granting an access authorization to the to-be-scheduled access request:

when the to-be-scheduled access request is a traffic policing request for a specific memory, when an access authorization is already granted to a previous traffic policing request for a specific memory with a same access address in a second predetermined quantity of scheduling periods before the current scheduling period, combining the to-be-scheduled access request and the previous traffic policing request for a specific memory.

11. A memory access request scheduling apparatus, configured to schedule an access request in a storage system comprising multiple memories, wherein the apparatus comprises a processor; and a non-transitory computer-readable storage medium including computer-executable instructions executed by the processor to perform, on the memory access request scheduling apparatus, operations comprising:

receiving a to-be-enqueued access request, and determining a memory to which the to-be-enqueued access request requests access, wherein the to-be-enqueued access request is used for requesting access to one or more of the multiple memories;

writing the to-be-enqueued access request into a first queue in a first access queue group corresponding to the memory, wherein the first access queue group is one of a multiple preset candidate access queue groups, wherein the multiple preset candidate access queue groups comprise:

common candidate access queue groups that are in a one-to-one correspondence to the multiple memories, and a special candidate access queue group corresponding to at least two of the multiple memories, and wherein each one of the multiple preset candidate access queue groups comprises at least one candidate access queue;

first selecting a group of to-be-scheduled queues by selecting one candidate access queue from each one of the multiple preset candidate access queue groups, as a to-be-scheduled queue;

second selecting, from the group of to-be-scheduled queues and according to an access timeslot of each memory of the multiple memories, an alternative queues that can participate in scheduling in a current clock period wherein selecting an alternative queue of the alternative queues comprises:

determining, according to a record of an access timeslot scoreboard, an idle memory of the group of memories whose access timeslot corresponding to a current scheduling period is not occupied, wherein the access timeslot scoreboard is used for recording an occupation status of an access timeslot of each memory, and using a to-be-scheduled queue corresponding to the idle memory as the alternative queue of the alternative queues;

third selecting, from the alternative queues provided by the second selecting, a specified queue in scheduling in the current clock period;

extracting a to-be-scheduled access request from the specified queue; and granting an access authorization to the to-be-scheduled access request.

12. The apparatus according to claim 11, wherein the writing the to-be-enqueued access request into one queue in one access queue group corresponding to the memory comprises: when the to-be-enqueued access request is used for requesting access to the more than one memories, placing the to-be-enqueued access request in one access queue in the special candidate access request queue group.

13. The apparatus according to claim 12, wherein the placing the to-be-enqueued access request in one access queue in the special candidate access request queue group comprises: when the special candidate access request queue group comprises two candidate access request queues, place the to-be-enqueued access request in one candidate access request queue in the special candidate access request queue group in a ping-pong enqueue manner.

14. The apparatus according to claim 11, wherein the writing the to-be-enqueued access request into one queue in one access queue group corresponding to the memory comprises:
    when the to-be-enqueued access request is used for requesting access to one memory, determining a target memory that the to-be-enqueued access request is to access; and
    placing the to-be-enqueued access request in one access queue in a target common candidate access request queue group corresponding to the target memory.

15. The apparatus according to claim 14, wherein the placing the to-be-enqueued access request in one access queue in a target common candidate access request queue group corresponding to the target memory comprises: when the target common candidate access request queue group comprises two candidate access request queues, placing the to-be-enqueued access request in one of the candidate access request queues in a ping-pong enqueue manner.

16. The apparatus according to claim 11, wherein the third selecting, from the alternative queues, a specified queue in scheduling in the current clock period comprises selecting an alternative queue with a highest weight from the alternative queues in a weighted round robin manner, as the specified queue.

17. The apparatus according to claim 11, wherein granting an access authorization to the to-be-scheduled access request comprises: when the to-be-scheduled access request is a traffic policing request for a specific memory, and in a preset instruction buffer, no authorized traffic policing request for a specific memory with an address the same as an address in the instruction buffer exists, granting the access authorization to the to-be-scheduled access request.

18. The apparatus according to claim 11, wherein granting an access authorization to the to-be-scheduled access request comprises: when the to-be-scheduled access request is a traffic policing request for a specific memory, and in a preset instruction buffer, an authorized traffic policing request for a specific memory with an address the same as an address in the instruction buffer exists, after the authorized traffic policing request for a specific memory is extracted, granting the access authorization to the to-be-scheduled access request.

19. The apparatus according to claim 17, wherein the operations further comprise:
    after the access authorization is granted to the to-be-scheduled access request, buffering the to-be-scheduled access request to the instruction buffer, and extracting the to-be-scheduled access request after a first predetermined quantity of periods.

20. The apparatus according to claim 12, wherein the operations further comprise:
    when the to-be-scheduled access request is a traffic policing request for a specific memory, and an access authorization is already granted to a previous traffic policing request for a specific memory with a same access address in a second predetermined quantity of scheduling periods before the current scheduling period, combining the to-be-scheduled access request and the previous traffic policing request for a specific memory.

* * * * *